United States Patent [19]

Spector

[11] Patent Number: 4,852,933
[45] Date of Patent: Aug. 1, 1989

[54] SOLID WASTE CARRIER TAILGATE-SIDEWALL CLOSURE REINFORCING LATCH MEANS

[75] Inventor: Saul R. Spector, Palm City, Fla.

[73] Assignee: Steco, Inc., St. Clair, Pa.

[21] Appl. No.: 132,767

[22] Filed: Dec. 14, 1987

[51] Int. Cl.⁴ .............................................. B60J 5/10
[52] U.S. Cl. ........................................ 296/50; 292/36
[58] Field of Search ................... 296/50; 292/39, 167; 414/513

[56] References Cited

U.S. PATENT DOCUMENTS

| | | |
|---|---|---|
| 2,949,327 | 8/1960 | Totaro . |
| 2,995,400 | 8/1961 | Posivio ................... 296/50 |
| 3,078,121 | 2/1963 | Dempster et al. .......... 296/56 |
| 3,170,578 | 2/1965 | Moreland . |
| 3,211,493 | 10/1965 | Mandel ................... 296/50 |
| 3,548,540 | 12/1970 | Cullins . |
| 3,757,969 | 9/1973 | Smith . |
| 3,784,243 | 1/1974 | Pastva ................ 296/50 X |
| 3,815,764 | 6/1974 | Gilfillan et al. .......... 414/513 |
| 3,873,149 | 3/1975 | Churchman . |
| 3,885,349 | 5/1975 | Owen . |
| 4,044,914 | 8/1970 | Hopkins . |
| 4,307,541 | 12/1981 | Farmer . |

FOREIGN PATENT DOCUMENTS 860186 1/1971 Canada ...................... 292/139

Primary Examiner—Robert B. Reeves
Assistant Examiner—Brian Sells
Attorney, Agent, or Firm—Sanford J. Piltch

[57] ABSTRACT

A reinforcing latching means for maintaining the integrity of the upper tailgate-sidewall joint closure in a refuse carrier with a vertically hinged tailgate assembly including a handle disposed along the bottom of the tailgate which mechanically rotates a vertically oriented control shaft and is operatively connected to at least one horizontally disposed latching rod means horizontally moveably along the tailgate for controlling the engaging and disengaging of said at least one latching rod means with a latching plate means disposed along the exterior lateral surface of the sidewall.

12 Claims, 3 Drawing Sheets

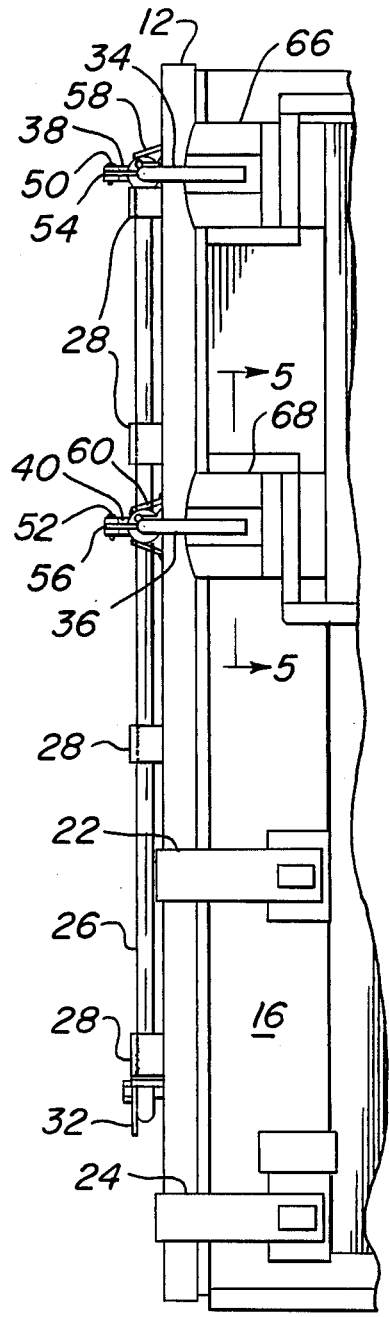
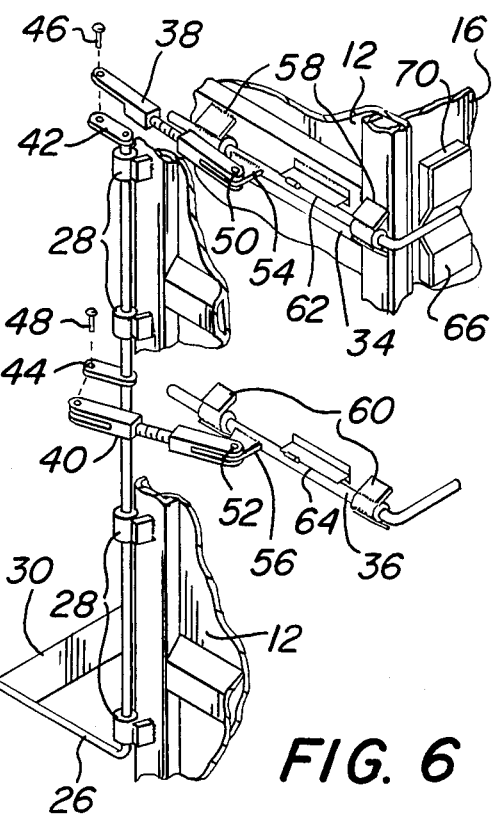
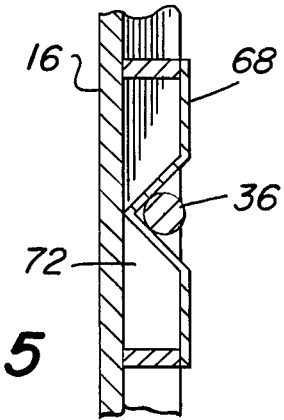
FIG. 4
FIG. 6
FIG. 5

SOLID WASTE CARRIER TAILGATE-SIDEWALL CLOSURE REINFORCING LATCH MEANS

BACKGROUND OF THE INVENTION

In the operation of refuse and other solid waste material hauling carriers, some having a rearwardly moveable pushblade or ejector for compacting or ejecting the load from a rear opening in the carrier, the tailgate can be skewed away from its normally orthogonal relationship with the sidewalls by the force of the compaction of the load against the closure points between the tailgate and the sidewalls. A tailgate which is pivoted about a vertically oriented hinging mechanism between the tailgate and one of the two sidewalls of the carrier resists the compaction forces adequately at the hinge point. However, at the closure between the free end of the tailgate and the other sidewall, the load compaction forces cause a loss of closure integrity. This loss of closure integrity can be seen as the skewing of the closure or the loss of the orthogonal relationship between the tailgate and the sidewall. The term most commonly used to describe this problem is bulging.

Bulging of the tailgate and sidewall adjacent the free end of a vertically hinged tailgate can occur at the top or at the bottom of the tailgate-sidewall closure. It has previously been found that latch plates, one of which is attached to the tailgate and extends outward from the free end of the tailgate and then bends at right angles to mate with the one which is attached to the external lateral surface of the adjacent sidewall, resolve the problem quite efficiently. Use of such a latch plate design requires convenient access to the latch plates by an operator due to the manual engaging and disengaging of the latch plates by the insertion of a keeper to keep the tailgate plate or hasp in place over the sidewall plate or staple.

Assuming that the operator of the refuse carrier is of normal height, only those latch plates which were within reach of the operator standing on the ground could be conveniently engaged or disengaged. Any such latch plates which were placed at or near the upper extent of the carrier tailgate-sidewall closure would not be conveniently reachable by an operator standing on the ground. An operator would be required to climb up the sidewall of the carrier to engage or disengage these latches or a control mechanism operable from the ground would be required. An operator may or may not be able to accomplish the disengaging of these latches if the compaction forces have skewed the closure joint. The keeper may be jammed in place and the operator may not be able to disengage the latch without first relieving the pressure exerted on the tailgate-sidewall closure joint.

There have been attempts at remedying these problems for overhead hinged tailgate assemblies where the operator must release both sides of the lower tailgate, or all the latches at the same time. With an overhead tailgate hinge the skewing of the tailgate-sidewall closure cannot occur because the tailgate is secured to both sidewalls by the hinging mechanism. Further, since most of the latches appear at the bottom of the tailgate, the operator can reach the latches to operate them conveniently.

Another attempt at remedying the problem of compaction pressure skewing the tailgate-sidewall closure joint for outwardly swinging tailgates with vertically oriented hinging mechanisms along one side thereof is the introduction of a control arm for operating each of several latches simultaneously. The control arm causes the insertion of a tongue of each of several latch plates located on the tailgate into an opening in each of several mating latch plates located on and extending rearward of the sidewall locking the tailgate in a closed position. However, the rearward pressure of the waste compaction process jams the tongue against the side of the opening in the sidewall latch plate jamming it in place. Once jammed, the tongue inhibits the free movement of the control arm and the other latches of the mechanism for disengaging the latching mechanism and unlocking the tailgate. Relief from the compaction pressure by forcing the tailgate inward against the rear of the sidewall is required before normal operation of the latch can be resumed. Inherent in the jamming of this type latch mechanism is the loss of joint closure integrity caused by the skewing of the tailgate and the sidewall away from their normal orthogonal relationship.

The problem of loss of integrity in tailgate-sidewall closure occurs in open topped carriers with compaction/ejection assemblies using a sidewall/tailgate hinging mechanism. This type hinging mechanism permits the tailgate to swing out from the load bed about the hinge positioned vertically at the joint between one sidewall and the tailgate. Because of the hinge mechanism the compaction forces do not effect this joint between the tailgate and the sidewall. However, the opposite sidewall closure with the tailgate is entirely different. Only conventional latches had been used which permitted the loss of integrity of the closure, the loss of orthogonality between the sidewall and the tailgate, and the skewing of the joint. This resulted in the inability to open the latches at the tailgate-sidewall closure when the load was compacted against the tailgate requiring partial manual removal of the refuse from the carrier until the pressure was released allowing the latches to be operated.

It is, therefore, an object of the present invention to provide a tailgate-sidewall joint closure for vertically hinged tailgates which will not lose its integrity or orthogonality with the exertion of compaction forces against the joint closure.

It is a further object of the present invention to provide a latching system for preventing the loss of integrity of the tailgate-sidewall joint closure in vertically hinged tailgate systems for solid waste carriers which is engagable or disengagable by the operator from the ground.

It is another object of the present invention to provide a latching system which operates several latches at a time through the use of a single control mechanism.

Other objects will appear hereinafter.

SUMMARY OF THE INVENTION

The present invention may be used with a container or carrier for compacting and transporting solid waste material including a load bed, two upstanding walls on either side of the load bed, a forward closed end disposed between and of equal height as the two sidewalls having disposed immediately adjacent the forward end a rearwardly operable load compaction and ejection blade for compacting or ejecting the load from the carrier and an outwardly swinging vertically hinged tailgate assembly disposed between and of equal height to the sidewalls at the rear of the carrier.

The present invention is an apparatus for significantly strengthening the tailgate-sidewall joint closure between the outwardly swinging end of a tailgate and the opposing sidewall of a solid waste carrier with a vertically hinged tailgate assembly to prevent outward bulging of the mechanical joint caused by the rearward compaction of the load. The apparatus, a reinforcing latching means, comprises a single handle means disposed along the bottom portion of the hinged tailgate assembly which mechanically rotates a vertically oriented control shaft about an axis defined by the circumference of said control shaft. The control shaft is operatively connected to at least one horizontally disposed latching rod means capable of horizontal movement along the hinged tailgate assembly for controlling the engaging and disengaging of said at least one latching rod means with a latching plate means disposed along the exterior lateral surface of the upper portion of the sidewall opposing the outwardly swinging end of the hinged tailgate assembly.

The reinforcing latching means further comprises a latching rod means control arm which is connected eccentrically to the vertically oriented control shaft and fixedly attached to said at least one latching rod means at a point along the latching rod means between the midpoint and the end of said latching rod means proximal to said vertical control shaft. The latching rod means has a right angle bend at its distal end for engaging with said latching plate means. The latching plate means has a V-notch cut into its exposed major face for engaging said latching rod means.

The single handle means is retained within a safety latch disposed along the bottom portion of said hinged tailgate assembly when said reinforcing latching means is in the engaged position.

BRIEF DESCRIPTION OF THE DRAWINGS

For the purpose of illustrating the invention, there are shown in the drawings forms which are presently preferred; it being understood, however, that the invention is not limited to the precise arrangement and instrumentalities shown.

FIG. 4 is a side view of the outwardly swinging end of the tailgate and the rearmost section of the opposing sidewall showing the reinforcing latch means of the present invention.

FIG. 5 is a sectional view of the reinforcing latch means of the present invention taken along line 5—5 of FIG. 4.

FIG. 6 is an exploded segmented isometric view of the reinforcing latch means of the present invention.

DETAILED DESCRIPTION OF THE INVENTION

The following detailed description is of the best presently contemplated modes of carrying out the present invention. This description is not intended in a limiting sense, but is made solely for the purpose of illustrating the general principles of the invention.

Figure 1:
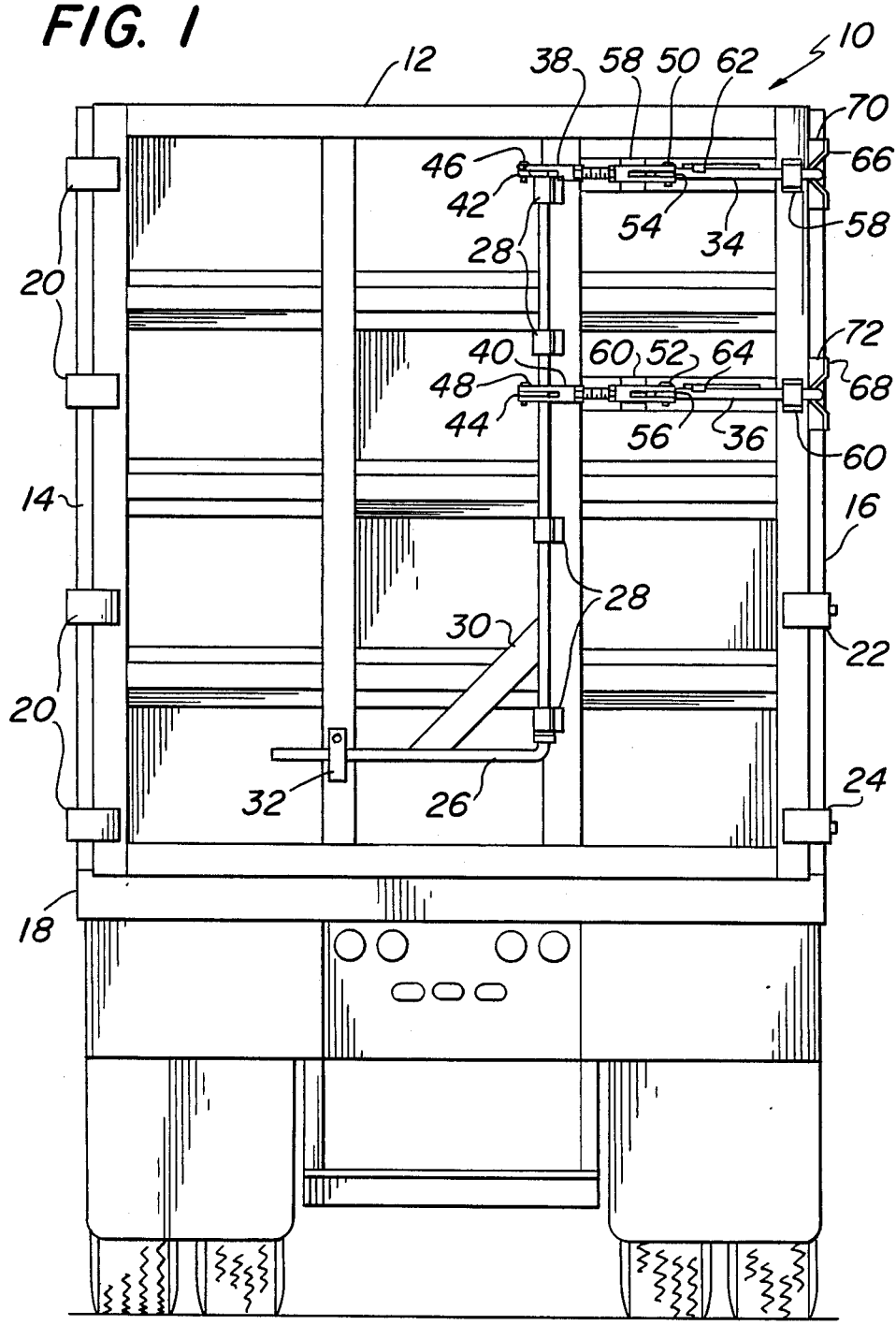
FIG. 1 is a rear plan view of the reinforcing latch means of the present invention installed on the rear of a solid waste material carrier.

Referring now to the drawings in detail, wherein like numerals represent like elements, there is shown in FIG. 1 the rear of an open top compaction and ejection refuse or solid waste carrier or trailer 10. The rear of the carrier or trailer 10 includes a tailgate 12 and the rearmost portions of the load body consisting of a left and right upstanding sidewall, 14 and 16, and a load bed 18. The load body also includes a forward closed end (not shown) and a rearwardly moveable ram or blade disposed between the sidewalls for the compacting or ejecting of the load. Reference can be had to U.S. Pat. No. 3,815,764 (Gilfillan, et al.), which patent is assigned to the assignee of this application, for a detailed description of such elements and the interrelationships among them. Such description is incorporated herein by reference.

The tailgate 12 is a vertically and horizontally reinforced rear end closure of the load body of the carrier or trailer 10 as can be seen from the members at each end, at the top and bottom, and at predetermined points measured both vertically and horizontally across the tailgate. The tailgate 12 is mounted to the trailer 10 by a hinge positioned vertically along the closure formed by the left sidewall 14 and the tailgate 12. The tailgate 12 can also be hinged on its right side to the right sidewall 16, if desired. The hinge may be any standard type using several hinge mechanisms to connect the tailgate 12 to the sidewall 14 or a single hinge mechanism extending from the top of the tailgate to the bottom and likewise on the sidewall. The hinge mechanism is well known to those working with refuse or solid waste carriers requiring heavy duty hinges and reinforced walls and ends.

The hinge 20, comprised of four separate but interacting hinges, is located at the left side of the tailgate 12 forming the joint closure between the left sidewall 14 and the tailgate. The hinge 20 will not be shown in any further detail as its construction is well known to those in the refuse and solid waste material carrier or trailer construction business and in order that the drawings not appear cluttered.

The tailgate 12 swings outward about the hinge 20. When closed, the tailgate 12 abuts the rearmost end of the right sidewall 16 and is secured to the right sidewall by several latches. The bottom latches 22, 24 are operable from the ground by the operator of the trailer 10. The hasps of the latches 22, 24 are hinged at their connection to the tailgate 12 and may be opened or disengaged by removing a pin from the staple freeing the hasp. Both hasp and staple of the latches 22, 24 are welded to the tailgate 12 and sidewall 16. This conventional method of securing the tailgate to the sidewall is considered satisfactory only as long as the latch is reachable by the operator from a position on the ground where sufficient leverage can be attained for disengaging the latches.

In compacting and ejecting trailers an enormous amount of pressure in the form of rearward force applied by the ejection blade and expansion forces of the solid waste material is exerted on the rear joint closures between the tailgate 12 and the sidewalls 14, 16. The vertical hinge 20 is sufficiently strong to withstand these forces. However, the conventional latches 22, 24 may tend to jam as the rearward pressure is applied to the joint closure. Additionally, the sidewall tends to bulge under the exertion of the forces which tends to twist the hasp and the staple out of alignment, either causing a jamming or the unwanted release of the latch.

Bulging of the sidewall, as a reaction to the compacting force, usually occurs nearer the top of an open top trailer with a vertically hinged tailgate. This is due to there not being a connection between the rear upper corners of the sidewalls as there would be if the tailgate were hinged at the top of the carrier or trailer. If the bulging is to such an extent as to cause the latches to become misaligned and jammed, it is just as likely that the latches will release before it is desired for them to be released. Since the bulging normally occurs at the top of the carrier or trailer, conventional latches can be used at the bottom of the tailgate-sidewall joint closure between the free end of the tailgate 12 and the adjacent sidewall 16. However, loss of integrity in the joint closure between the free end of the tailgate 12 and the sidewall 16 is not desirable.

The upper portion of the tailgate-sidewall joint closure must be retained in its normal orthogonal relationship regardless of any load compaction pressure which may be applied. To accomplish this task at least one, and preferably two, conventional latches are replaced with the reinforcing latch means of the present invention, a latch mechanism providing ease of operation and the ability to reinforce the upper portion of the tailgate-sidewall joint closure.

A control shaft 26 is mounted to a vertical reinforcing member of the tailgate 12 such that it is capable of rotating about an axis defined by the circumference of the control shaft. The control shaft 26 is rotatable within several vertically oriented guides 28. Each of the guides is welded to the tailgate reinforcing member and aligned coaxially so that the control shaft 26 is capable of free rotational movement. The control shaft 26 is bent at right angles at its lowest extension point so that a horizontal segment of the control shaft 26 can act as a rotational lever in engaging and disengaging the latches to be described below. A support 30 retains the vertical and horizontal segments of the control shaft 26 in their right angle relationship.

A keeper plate 32 maintains the horizontal segment of the control shaft 26, and the latches, in the closed or engaged position. The keeper plate 32 is mounted to the tailgate 12 by means of a large bolt. The keeper plate 32 is placed against the bolt head and a nut of appropriate size is threaded onto the bolt permitting rotational movement of the keeper plate about the bolt shaft with a minimal amount of translational movement. A sleeve or spacer is placed over the shaft of the bolt to permit the control shaft 26 to rest thereon and the bolt is threaded into the tailgate 12. Other equivalent methods of mounting known to those in the art are acceptable provided that sufficient space is provided for the control shaft 26 and the keeper plate 32 is free to rotate about the fastening means.

The upper portion of the vertical segment of the control shaft 26 is connected to at least one, and preferably to two, horizontally disposed latching rod means 34, 36 by an equal number of sets of adjustable control arms 38, 40. Each of the adjustable control arms 38, 40 have the same elements and function in the same manner. Each of the control arms 38, 40 has a threaded rod for opening or closing the space between the two ends of the arms 38, 40. The space between the two ends of each of the arms 38, 40 controls the horizontal distance which each of the latching rod means 34, 36 will travel during the engaging and disengaging of the reinforcing latch means of the present invention. The greater the space between the ends of the arms 38, 40 the greater will be the distance travelled, and vice versa.

Figure 2:
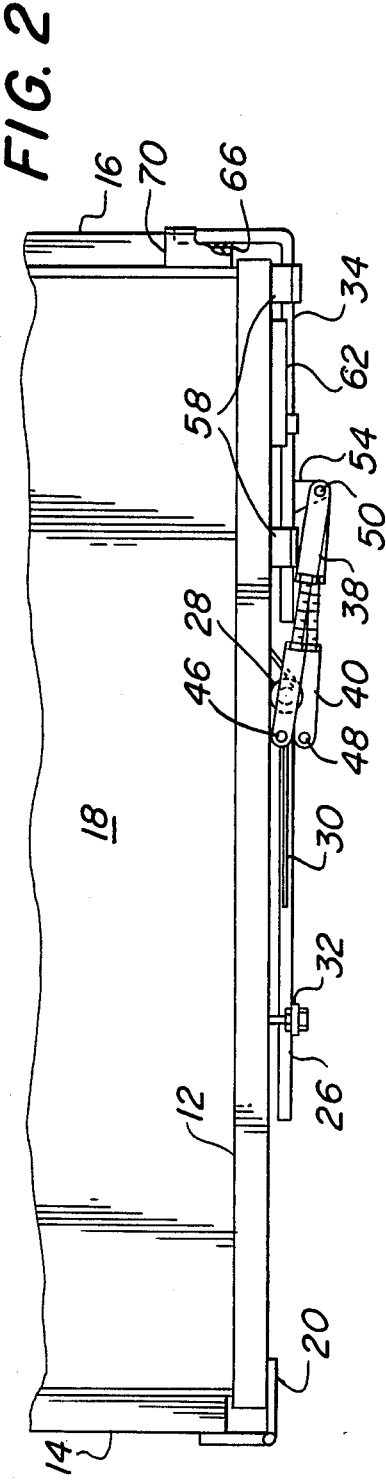
FIG. 2 is a top plan view of the tailgate and rearmost sidewalls of a solid waste material carrier showing the reinforcing latch means of the present invention in the engaged position.
Figure 3:
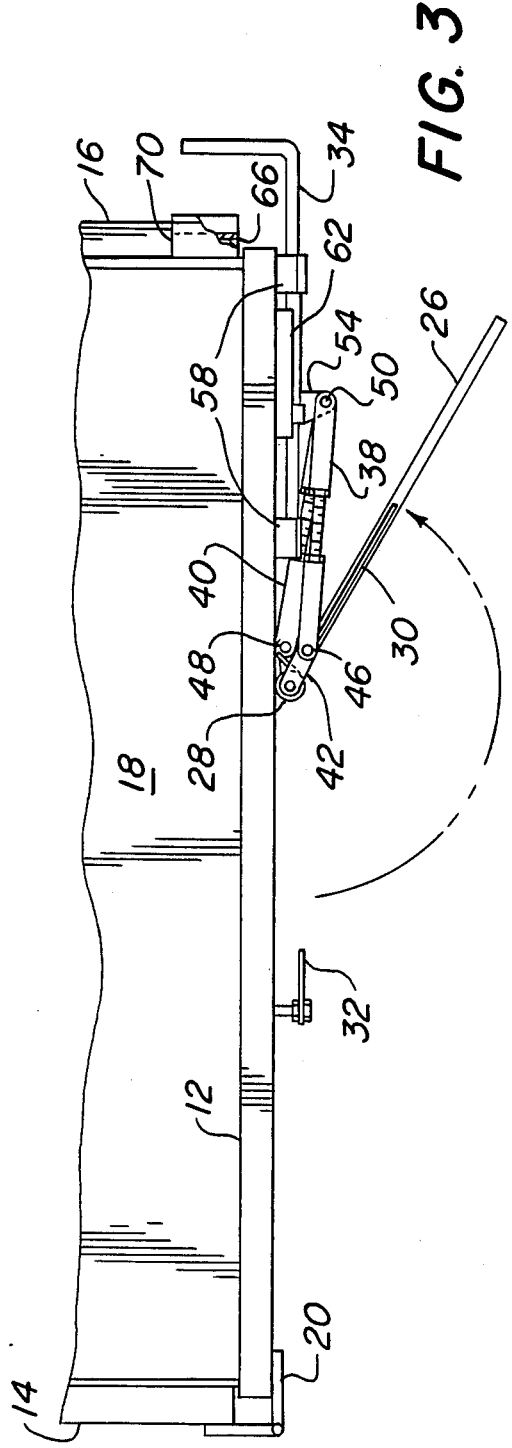
FIG. 3 is a top plan view of the tailgate and rearmost sidewalls of a solid waste material carrier showing the reinforcing latch means of the present invention in the disengaged position.

The proximal ends of the adjustable control arms 38, 40 are connected to the control shaft 26 by means of short tie-in arms 42, 44 which create an eccentric rotational movement about the control shaft 26. The control shaft 26 passes through keyed holes in each of the short tie-in arms 42, 44 in order to maintain the tie-in arms 42, 44 in a fixed position. The other end of each of the short tie-in arms 42, 44 is connected to the proximal ends of each of the adjustable control arms 38, 40 by compression pins 46, 48. Thus, as the control shaft 26 is rotated from its position of retention behind the keeper plate 32 (which is the engaged position of the reinforcing latch means), as shown in FIG. 2, to its released position, as shown in FIG. 3, the adjustable control arms 38, 40 and the latching rod means 34, 36 are moved in a rightward direction disengaging the reinforcing latch means. As the control shaft 26 is returned to its retention position behind the keeper plate 32, the translational rightward movement is reversed and the reinforcing latch means are engaged.

In order that the right and left translational movement of the latching rod means 34, 36 be accomplished in the manner set forth above, the distal ends of the adjustable control arms 38, 40 are connected by compression pins 50, 52 to control arm extensions 54, 56 welded to the latching rod means 34, 36 at a predetermined point near the proximal end of the latching rod means. Each of the latching rod means 34, 36 are moveable in a right or left direction horizontally within a set of guides 58, 60 in accordance with the control shaft 26 and control arms 38, 40. These guides 58, 60 are welded to channels which are in turn welded to the tailgate 12. The channels are required in order to provide a uniform surface level upon which the guides 58, 60 can be mounted. Alternatively, the guides 58, 60 may be mounted to any of the several reinforcing members of the tailgate 12, or any combination thereof.

Additionally, guide rods 62, 64 are spaced away from either the surface of any reinforcing member of the tailgate 12 or a channel providing a uniform surface level by a rectangularly shaped plate so that the guide rods 62, 64 contact the upper outward facing surface of each of the latching rod means 34, 36 to keep the latching rod means from bending outwardly during their travel and in coaxial alignment with the set of guides 58, 60. The guide rods 62, 64 are welded to the rectangular plate which is welded to the channels or directly to the tailgate 12. The channels span the horizontal distance between adjacent reinforcing members on the external surface of the tailgate 12.

Referring to FIGS. 4 and 5, the distal ends of the latching rod means 34, 36 are bent at right angles to extend around the tailgate-sidewall joint closure and to contact latching plates 66, 68. Each of the latching plates 66, 68 are welded to the exterior lateral surface of the upper portion of the sidewall 16. The particular locations for welding of the latching plates 66, 68 being opposite the axis of the latching rod means 34, 36 so that the right angle bent segment of the latching rod means 34, 36 fully engage the V-shaped cutout or notch in the major exposed face of each of the latching plates 66, 68. Each latching plate 66, 68 is mounted on a latching plate support 70, 72. The latching plate supports 70, 72 provide a uniform spacing between a multi-level external lateral surface of the sidewall 16 and the latching plates 66, 68. Thus, when fully engaged within the V-notch of the latching plates 66, 68, the latching rod means 34, 36, as controlled by the control shaft 26, prevent the loss of integrity of the joint closure between the vertically hinged outwardly swinging tailgate 12 and the upper portion of the sidewall 16 caused by the bulging out of the sidewall 16 due to the compaction of the load in the carrier 10.

The joint closure between the tailgate 12 and the sidewall 16 is significantly strengthened by the addition of the wrap-around latch mechanism defined by the latching rod means 34, 36 and the latching plates 66, 68 respectively positioned on the tailgate 12 and the sidewall 16 of the carrier 10. The ease of operation and elimination of latch jamming is insured by the use of the eccentrically offset control arms 38, 40 coupled to the control shaft 26 as used to manually engage and disengage the reinforcing latch means across the tailgate-sidewall joint closure.

Each of the elements described above are preferred to be of a steel or high tensile steel alloy and of sufficient dimension and weight to more than withstand the normal forces occurring in the operation of a refuse carrier or trailer having a ram or push blade for compacting or ejecting the load from a rear opening thereof. Each of the elements comprising a plate is preferred to have a minimum thickness of ¼ of an inch and each of the elements comprising a shaft or rod is preferred to have a minimum diameter of 1¼ inches. Each of the elements comprising a guide through which a shaft or rod passes is preferred to have an internal diameter of 1¼ inches and an external minimum diameter of 1.75 inches. The elements comprising the keeper mechanism are preferred to be a 0.625 inch threaded bolt with matching nut and a 1½ inch long sleeve or spacer.

The reinforcing latch means of the present invention controls and prevents the bulging outward of the sidewall away from the free end of the tailgate. The conventional latch means disposed along the lower portion of the tailgate-sidewall joint closure in conjunction with the reinforcing members of the tailgate control and prevent the inadvertent opening of the tailgate from rearward bulging during the compaction of the solid waste material in the carrier. Hence, a reinforcing latch means is provided which can be manipulated from the ground by an operator for engaging and disengaging more than one latching means while accomplishing the foregoing required tasks for safe and efficient operation of an open top solid waste material compacting and ejecting carrier.

The present invention may be embodied in other specific forms without departing from the spirit or essential attributes thereof and, accordingly, reference should be made to the appended claims, rather than to the foregoing specification, as indicating the scope of the invention.

I claim:

1. A carrier for compacting and transporting solid waste material including a load bed, two upstanding walls on either side of the load bed, a forward closed end disposed between and of equal height as the two sidewalls having disposed immediately adjacent the forward end a rearwardly operable load compaction and ejection blade for compacting or ejecting the load from the carrier and an outwardly swinging tailgate assembly disposed between and of equal height to the sidewalls at the rear of the carrier, said tailgate assembly being vertically hinged to one of the sidewalls, the improvement comprising a reinforcing latching means for preventing outward bulging of the mechanical tailgate-sidewall joint closure formed between the distal end of said tailgate assembly and the rearward facing surface of the opposing sidewall caused by rearward compaction of solid waste material contained in the carrier; said tailgate-sidewall joint closure reinforcing latching means comprising a single handle means disposed along the bottom portion of the tailgate assembly which mechanically rotates a vertically oriented control shaft about an axis defined by the circumference of said control shaft and is operatively connected by said control shaft to at least one horizontally disposed latching rod means having a right angle bend at the distal end of said latching rod means extending around the tailgate-sidewall joint closure a distance along the opposing sidewall for engaging a latching plate means, said at least one latching rod means being capable of horizontal movement along the tailgate assembly for controlling the engaging and disengaging of said at least one latching rod means with said latching plate means, said latching plate means being disposed along the exterior lateral surface of the upper portion of said opposing sidewall.

2. The reinforcing latching means according to claim 1 further comprising a latching rod means control arm connected eccentrically to the vertically oriented control shaft and fixedly attached to said at least one latching rod means at a point along the latching rod means between the midpoint and the end of said latching rod means proximal to said vertical control shaft.

3. The reinforcing latching means according to claim 1 wherein said latching plate means has a V-notch cut into its exposed major face for engaging said latching rod means.

4. The reinforcing latching means according to claim 1 wherein said single handle means is retained within a safety latch disposed along the bottom portion of said hinged tailgate assembly when said reinforcing latching means is in the engaged position.

5. A reinforcing latching means for refuse or other solid waste carriers and/or containers having an outwardly swinging tailgate assembly vertically hinged to one sidewall and making a mechanical joint closure with the opposing sidewall of the carrier and/or container comprising a single handle means disposed along the bottom portion of the tailgate assembly which mechanically rotates a vertically oriented control shaft about an axis defined by the circumference of said control shaft and is operatively connected by said control shaft to at least one horizontally disposed latching rod means having a right angle bend at the distal end of said latching rod means extending around the closure between the tailgate assembly and the opposing sidewall a distance along the opposing sidewall for engaging a latching plate means, said at least one latching rod means being capable of movement along the tailgate assembly for controlling the engaging and disengaging of said at least one latching rod means with said latching plate means disposed along the exterior lateral surface of the upper portion of the opposing sidewall of the carrier and/or container for retaining the tailgate assembly and the sidewall opposing the closed distal end of said tailgate assembly in an orthogonal relationship in contravention of the expansion forces exerted upon the tailgate-sidewall joint closure by rearward compaction of refuse or other solid waste material contained in therein.

6. The reinforcing latching means according to claim 5 further comprising a latching rod means control arm connected eccentrically to the vertically oriented control shaft and fixedly attached to said at least one latching rod means at a point along the latching rod means between the midpoint and the end of said latching rod means proximal to said vertical control shaft.

7. The reinforcing latching means according to claim 5 wherein said latching plate means has a V-notch cut into its exposed major face for engaging said latching rod means.

8. The reinforcing latching means according to claim 5 wherein said single handle means is retained within a safety latch disposed along the bottom portion of said hinged tailgate assembly when said reinforcing latching means is in the engaged position.

9. A reinforcing latching means for strengthening a tailgate-sidewall joint closure between the outwardly swinging distal end of a tailgate assembly vertically hinged to one sidewall of a trailer and the opposing sidewall of the trailer and for preventing outward bulging of said mechanical tailgate-sidewall joint closure caused by rearward compaction of refuse or other solid material contained therein comprising a single handle means disposed along the bottom portion of the tailgate assembly which mechanically rotates a vertically oriented control shaft about an axis defined by the circumference of said control shaft and is operatively connected by said control shaft to at least one horizontally disposed latching rod means having a right angle bend at the distal end of said latching rod means extending around the closure between the tailgate assembly and the opposing sidewall a distance along the opposing sidewall for engaging a latching plate means, said at least one latching rod means being capable of movement along the tailgate assembly for controlling the engaging and disengaging of said at least one latching rod means with said latching plate means disposed along the exterior lateral surface of the upper portion of the opposing sidewall of the trailer.

10. The reinforcing latching means according to claim 9 further comprising a latching rod means control arm connected eccentrically to the vertically oriented control shaft and fixedly attached to said at least one latching rod means at a point along the latching rod means between the midpoint and the end of said latching rod means proximal to said vertical control shaft.

11. The reinforcing latching means according to claim 9 wherein said latching plate means has a V-notch cut into its exposed major face for engaging said latching rod means.

12. The reinforcing latching means according to claim 9 wherein said single handle means is retained within a safety latch disposed along the bottom portion of said hinged tailgate assembly when said reinforcing latching means is in the engaged position.

* * * * *